United States Patent [19]

Dobberpuhl

[11] 4,165,786
[45] Aug. 28, 1979

[54] WALK-BEHIND TILLER AND HANDLE MOUNTING THEREFOR

[75] Inventor: Dale R. Dobberpuhl, Horicon, Wis.

[73] Assignee: Deere & Company, Moline, Ill.

[21] Appl. No.: 850,142

[22] Filed: Nov. 10, 1977

[51] Int. Cl.$^2$ .................. B62D 51/04; A01B 33/02
[52] U.S. Cl. ............................ 172/43; 74/551.3; 180/19 R
[58] Field of Search ............... 172/42, 43, 256, 257, 172/258, 259, 260; 180/19 R, 19 S, 19 H; 74/525, 543, 551.1, 551.3, 551.6, 551.7, 551.8; 16/110 R, 111 R, 111 A, 112, 114 R; 403/388, 395, 396, 400

[56] References Cited

U.S. PATENT DOCUMENTS

| 1,751,694 | 3/1930 | Glasier | 172/43 |
| 2,583,846 | 1/1952 | Hull | 172/42 |
| 2,614,474 | 10/1952 | Merry | 172/43 |
| 2,757,013 | 7/1956 | Brier | 16/114 R X |
| 2,835,182 | 5/1958 | Smithburn | 172/43 |

FOREIGN PATENT DOCUMENTS

| 159354 | 10/1954 | Australia | 172/43 |
| 278858 | 11/1967 | Australia | 403/400 |

Primary Examiner—Richard T. Stouffer

[57] ABSTRACT

A rotary tiller includes a main frame comprising a pair of horizontal, fore and aft extending channel members disposed on opposite sides of a chain case having a lower end, in which a tine-supporting shaft is journalled, and an upper end having a pair of axially aligned cylindrical members fixed to and projecting transversely from opposite sides thereof. A drive shaft is journalled in one of the cylindrical members and projects therethrough into the chain case. Fixed to one end of the shaft is a pulley, which is connected by a belt, to be driven from a pulley fixed to a transverse output shaft of an engine mounted on a forward portion of the frame. The handle includes a pair of legs disposed in straddling relationship to the chain case and respectively connected to the cylindrical members, by a pair of U-bolts. The lower ends of the legs are respectively received in slots provided in the channel members.

5 Claims, 3 Drawing Figures

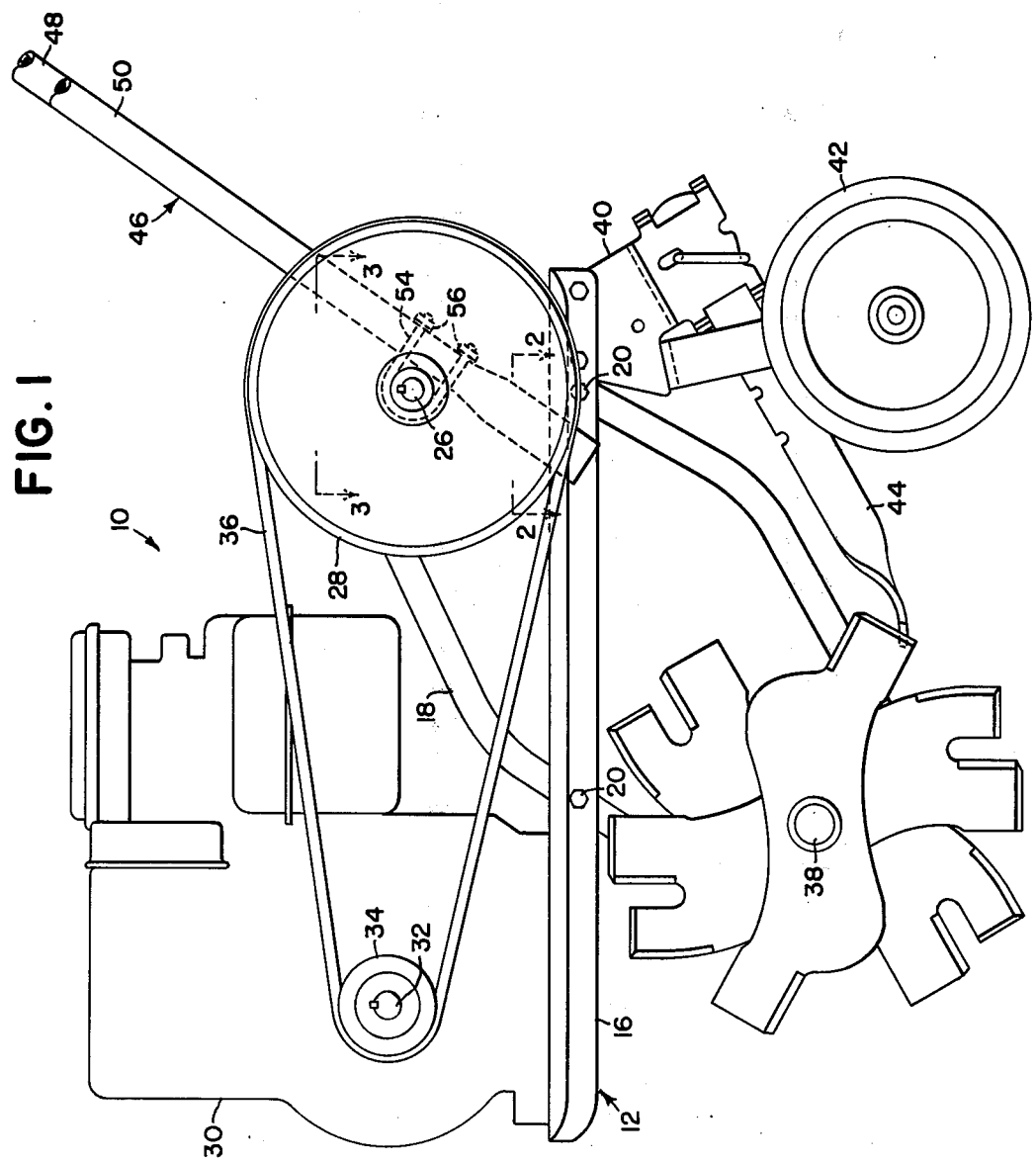
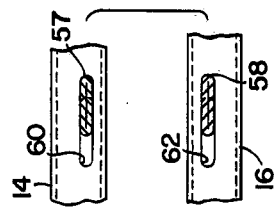
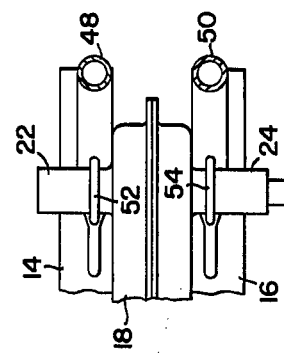

WALK-BEHIND TILLER AND HANDLE MOUNTING THEREFOR

BACKGROUND OF THE INVENTION

The present invention relates to walk-behind tillers and, more specifically, relates to a manner of mounting the operator's handle of such tillers.

U.S. Pat. No. 2,634,666 granted to Merry on Apr. 14, 1953 illustrates a relatively light weight rotary tiller comprising a main, fore-and-aft extending, horizontal frame fashioned from a pair of angle members. The angle members are located on opposite sides of and are bolted to a chain case. Supported on the forward ends of the angle members is an engine which has a transverse output shaft on which is mounted a pulley that is connected, by a drive belt, to a pulley mounted on a transverse drive shaft rotatably jounralled in an upper end of the chain case. An operator's handle includes a pair of legs having forward ends bolted or otherwise fixed to the chain case and having depending braces bolted or otherwise secured to the angle members.

The handle mounting of the tiller disclosed in the Merry patent has the disadvantage of being difficult to assemble since the braces have to be oriented just right relative to the legs and braces to respectively match holes provided in the chain case and frame.

SUMMARY OF THE INVENTION

According to the present invention, there is provided a novel handle mounting for a walk-behind rotary tiller and more particularly for a tiller having a pair of members defining a fore-and-aft extending horizontal frame and a drive shaft journalled in an upper end of a chain case at a location above the frame.

An object of the invention is to provide a handle mounting requiring no close tolerances, whereby the handle is simple to assemble.

Another object of the invention is to couple the handle to the tiller at a location defined by an existent structural member serving another function as well.

Specifically, it is an object of the invention to mount the handle on a pair of cylindrical members fixed in axial alignment to each other at the opposite sides of the chain case, one of the cylindrical members also serving to rotatably support a transverse shaft.

Yet another object is to provide a handle mounting including a pair of openings in the frame for receiving the bottom ends of a pair of handle legs.

These and other objects will become apparent from a reading of the ensuing description together with the appended drawings.

BRIEF DESCRIPTION OF THE DRAWINGS

FIG. 1 is a left side elevational view of a walk-behind rotary tiller constructed according to the principles of the present invention.

FIG. 2 is a horizontal sectional view taken along line 2—2 of FIG. 1 and showing the connection of the lower ends of the handle legs with the frame.

FIG. 3 is a horizontal sectional view taken along line 3—3 of FIG. 1 and showing the connection of the legs of the handle with the cylindrical members fixed to opposite sides of the chain case.

DESCRIPTION OF THE PREFERRED EBODIMENT

Referring now to FIG. 1, therein is shown a rotary tiller 10 including a main frame 12 comprising left and right fore-and-aft extending horizontal channel members 14 and 16. A chain case 18 is positioned between the members 14 and 16 and fixed thereto by bolts 20, which also serve in conjunction with other bolts (not shown), to hold opposite halves of the chain case together. The upper end of the chain case 18 is elevated a rear end portion of the frame 12 and right and left axially aligned cylindrical members or bosses 22 and 24 are fixed to the opposite sides of the chain case. A transverse drive shaft 26 having a pulley 28 fixed on one end thereof is journalled in and projects through the left cylindrical member 24, into the chain case 18. It is noted that the shaft 26 may project through the chain case into the right cylindrical member 22 as well, however it would be necessary to seal the chain case at two locations instead of one. An engine 30 is mounted on the forward end of the frame 12 and includes a transverse output shaft 32 having a pulley 34 fixed thereon and drivingly coupled to the pulley 24 by means of a belt 36. Normally, some sort of belt tensioning means would be provided for selectively disengaging the drive between the pulleys 28 and 34 however such means is not disclosed here for the sake of simplicity.

The lower end portion of the chain case 18 is located beneath the frame 12 at a location vertically below the engine 30 and journalled in the lower end portion of the chain case is a tine-carrying shaft 38. The shaft 26 is coupled to transmit power to the shaft 38 by means of a conventional speed reduction transmission comprising chains and sprockets (not shown).

Fixed to the rear of the frame 12 is a bracket 40 which carries a pair of support wheels 42 (only one shown) and a drag stake 44. The bracket 40 is releasably pivotally connected to the frame 12 by means, not described for the sake of brevity, which permit the bracket to be swung between a lowered position, as shown, wherein the wheels 42 and drag stake are respectively in lowered and raised transport positions, and a raised position wherein the wheels 42 and drag stake are respectively in raised and lowered working positions.

Located generally vertically above the bracket 40 is an operator's handle 46 including right and left transversely spaced tubular legs 48 and 50 disposed in straddling relationship to the chain case 18 and extending downwardly behind the cylindrical members 22 and 24. U-bolts 52 and 54 are respectively received on the cylindrical members 22 and 24 and have legs which extend through the handle legs 48 and 50 and receive nuts 56 (only those for U-bolt 54 are shown) which act to clamp the U-bolts and handle legs against the cylindrical members. It is here noted that J-bolts or some sort of mounting strap may be used in lieu of the U-bolts to secure the handle to the cylindrical members. The lower ends of the handle legs 48 and 50 are flattened, as at 57 and 58, and are received in respective slots 60 and 62 provided in the channel members 14 and 16, with forward and rearward edge portions respectively of each of the flattened leg portions 57 and 58 being in engagement with forward and rear ends of the slots 60. Thus, it will be appreciated that the handle may be assembled without the necessity of aligning holes in the handle with holes in the frame. Also, it will be appreciated that should the U-bolts 52 and 54 ever accidentally become loosened, the handle connection is such that no loss in operator control of the tiller 10 will result.

In operation, the operator transports the tiller by grasping and pressing downwardly on an upper portion (not shown) of the handle 46, which interconnects the legs 48 and 50, such as to rock the tiller 10 backwardly on its wheels 42. He then pushes or pulls the tiller to an area desired to be tilled.

To ready the tiller for tilling, the operator lifts up on the handle 46 such as to rock the tiller forwardly on its tines. He then releases the bracket 40 and swings it upwardly such that the wheels 42 are raised and the drag stake 44 is lowered to a substantially vertical position. The bracket is then fixed in its new position and the tiller is lowered onto the drag stake. The drive to the tines is then engaged and tillage is begun with the operator guiding the tiller through means of the handle 46. Also, in the event that the drag stake 44 has not penetrated the ground to the extent that the wheels 42 engage the ground, such penetration is accomplished by the operator pressing down on the handle 46.

Also, it will be appreciated that the handle 46 is mounted such that it may be easily assembled since no holes need to be brought into register with each other and due to the sizes of the slots 60 and 62 and the ability of the handle legs 48 and 50 to rotate about the cylindrical members 22 and 24, the slots 60 and 62 need not be placed with undue accuracy.

I claim:

1. In a walk-behind tiller including a generally horizontal, fore-and-aft extending frame, a chain case fixed to the frame and having an upper end located at a level thereabove, a pair of axially aligned, transversely extending cylindrical members respectively fixed to opposite sides of the chain case at an upper end portion thereof, a drive shaft being journalled in at least one of the the cylindrical members, and an operator's handle having a pair of legs fixed to the frame, the improvement wherein the handle is connected to the frame solely through means of said chain case; said handle legs straddling the chain case; and connection means respectively fixing said handle legs to said cylindrical members.

2. The tiller defined in claim 1 wherein said connection means includes a pair of fasteners respectively including first portions engaging the cylindrical members and legs projecting through the handle legs and secured therein by means of nuts threaded on the legs.

3. The tiller defined in claim 1 wherein said connection means includes a pair of U-bolts respectively engaging the cylindrical members and having a pair of legs projecting through a respective one of the pair of handle legs and secured therein by means of nuts received on the pairs of legs.

4. The tiller defined in claim 2 wherein the frame is provided with a pair of openings; said handle legs projecting downwardly beyond the cylindrical members and being respectively received in said openings.

5. The tiller defined in claim 4 wherein the openings are in the form of fore-and-aft elongated slots and that portion of each of said handle legs received in a respective slot having cross-section dimensioned in close approximation to the slot dimensions.

* * * * *